United States Patent [19]

Shahbaz et al.

[11] Patent Number: 4,528,679

[45] Date of Patent: Jul. 9, 1985

[54] AUTOMATIC COUNTING SYSTEM FOR PASSAGES

[75] Inventors: Zalmai S. Shahbaz; Klaus H. Frielinghaus, both of Rochester, N.Y.

[73] Assignee: General Signal Corporation, Stamford, Conn.

[21] Appl. No.: 474,870

[22] Filed: Mar. 14, 1983

[51] Int. Cl.[3] .......................... G06M 1/27; G01S 9/66

[52] U.S. Cl. .......................................... 377/6; 367/108

[58] Field of Search ...................... 377/6; 367/108, 93, 367/97

[56] References Cited

U.S. PATENT DOCUMENTS

| | | | |
|---|---|---|---|
| 540,090 | 3/1895 | Ellis | 377/6 |
| 2,082,941 | 6/1937 | Burnside | 377/6 |
| 3,079,077 | 2/1963 | Bolton | 367/108 |
| 3,727,034 | 4/1973 | Pope | 377/6 |
| 3,881,353 | 5/1975 | Fathaver | 377/6 |
| 3,997,866 | 12/1976 | Taylor et al. | 367/108 |
| 4,000,400 | 12/1976 | Elder | 377/6 |
| 4,009,389 | 2/1977 | Lindholm | 377/6 |
| 4,127,766 | 11/1978 | Thayer | 377/6 |
| 4,278,878 | 7/1981 | Kato | 377/6 |
| 4,356,387 | 10/1982 | Tsubota et al. | 377/6 |

*Primary Examiner*—John S. Heyman
*Assistant Examiner*—K. Ohralik
*Attorney, Agent, or Firm*—John F. Ohlandt; Milton E. Kleinman

[57] ABSTRACT

The invention is particularly useful for counting the passengers moving into and out of a common carrier vehicle such as a motor bus. Three ultrasonic ranging stations are provided to determine the presence and absence of passengers at three successive positions at the bus entrance. The three positions may correspond respectively to three steps through the entrance. Sequence logic circuitry is included for analyzing the sequence of detection of passengers at the three different ranging stations to establish a count of the number of passengers entering or leaving.

27 Claims, 4 Drawing Figures

AUTOMATIC COUNTING SYSTEM FOR PASSAGES

This invention relates to a system for detecting the movement of bodies, such as human bodies, through a constricted passage. The invention is particularly useful for counting the movement of passengers through the doors of common carrier vehicles such as motor buses. The terms "bodies" and "passengers" are used interchangeably below.

BACKGROUND OF THE INVENTION

A particular problem to which the present invention is addressed is the need for automatically counting the number of passengers which enter or exit a motor bus with accuracy. Prior systems which attempt to accomplish this task employ stair tread switches on two successive stair threads at the bus entrance passages for detecting the entrance or exit of passengers. The direction of passenger movement is determined by the sequence of occupancy of the stair treads. During heavy, close, passenger movement, the prior systems are inaccurate because the two stair tread signals do not provide sufficient information for accurate determination of the direction of travel of closely spaced occupants of the stair treads.

A prior system of the above type is presently marketed by the Dynamic Controls Corporation of South Windsor, Conn. as an "Automatic Passenger Counter System." That system is intended to accumulate data for a common carrier vehicle on the number of passengers boarding and departing from the vehicle at each stop, the number of passengers on board at any time, the total number of passengers carried on each trip, the real time and elapsed time for each stop, and the distance from the start of the trip to each stop. From that data, computations can be made of the average weekly passenger miles, the average weekly passenger trips, the average trip distance, and the average trip time. The present invention is directed to similar purposes, but to the accomplishment of those purposes with greater accuracy.

Accordingly, it is one object of the invention to provide an improved automatic counting system which provides improved reliability and accuracy in counting the number of bodies traversing a passage such as the entrance of a bus.

Another problem with the prior system has been that the stair tread switches are vulnerable to damage and wear.

Accordingly, it is another object of the invention to provide an improved automatic counting system for bodies traversing a passage which is much more reliable and has lower maintenance cost and lower vulnerability to wear and damage.

SUMMARY OF THE INVENTION

In carrying out the invention there is provided an automatic counting system for non-uniform bodies moving at non-uniform speeds in either direction through a constricted passage comprising a ranging apparatus having at least three ranging stations spaced longitudinally along the passage for detecting the presence and absence of bodies to be counted at said stations, and a sequence logic circuit connected to said ranging apparatus for detecting and interpreting the sequence in which bodies are detected at said ranging stations for thereby counting the passage of bodies.

DESCRIPTION OF PREFERRED EMBODIMENTS

Figure 1:
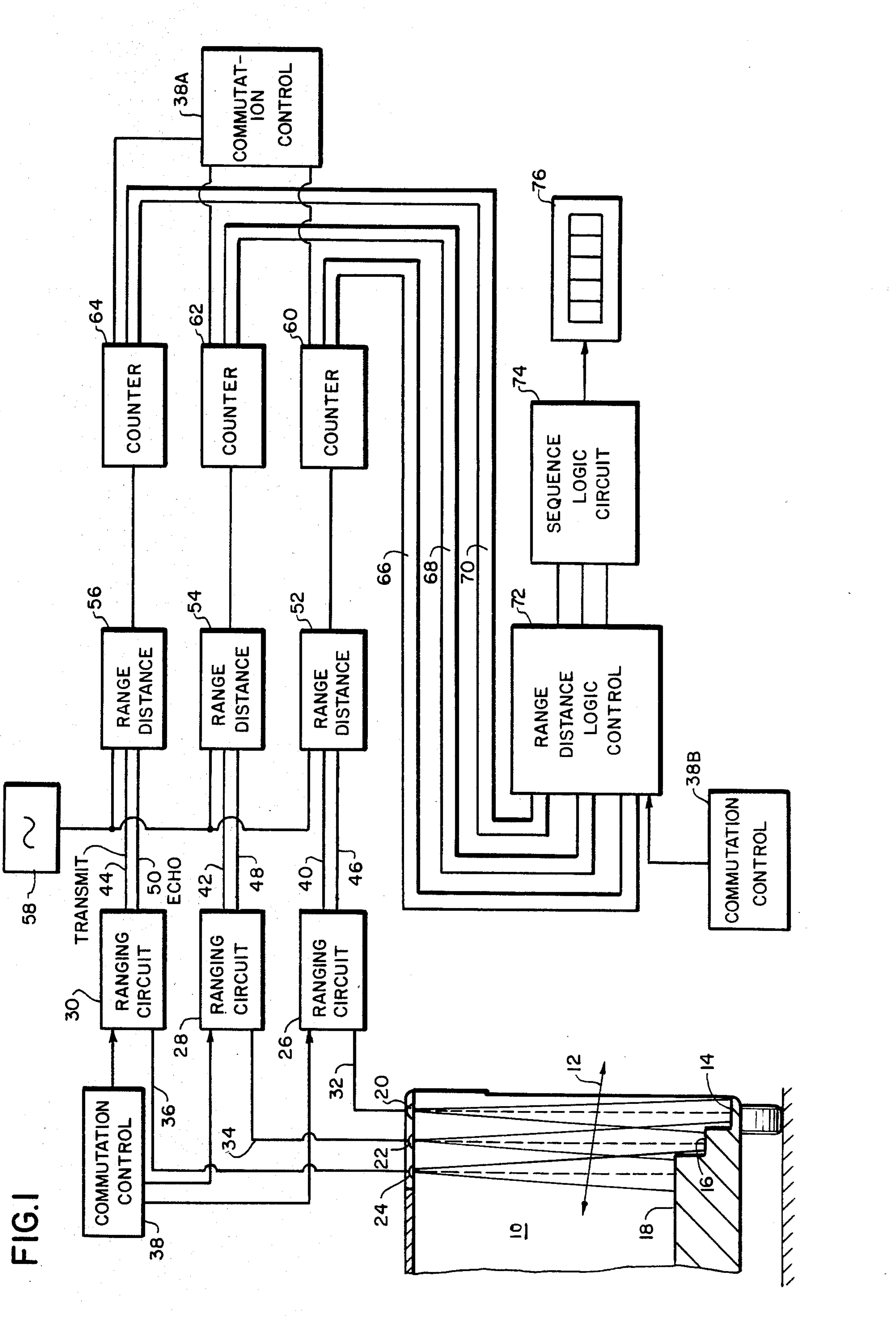
FIG. 1 is a simplified schematic diagram of a preferred system in accordance with the present invention.

Referring particularly to FIG. 1, there is illustrated a partial sectional end view of a common carrier motor bus 10 having passage for entrance or exit indicated by the arrow 12. The passage includes two steps 14 and 16 to accomodate the entering and exiting passengers. The steps 14 and 16, together with the floor level 18 of the bus provide a total of three steps upwardly from the pavement or curbing to the interior of the bus. The passage is thus referred to below as having three steps.

In the preferred embodiment of the system of the present invention, three ranging stations are provided for the bus entrance passage 12, and these ranging stations each include an ultrasonic transducer, as indicated respectively at 20, 22, and 24. The transducers are preferably spaced longitudinally along the passage 12, and are preferably, though not necessarily, arranged at approximately the same spacing as the steps 14, 16, and 18 so that each ranging station essentially serves one step.

The ranging stations also each include a ranging circuit 26, 28, 30 respectively connected to the transducers by connections 32, 34, and 36. The ranging circuits 26, 28, and 30 operate in a time sequence as determined by a commutation control circuit 38 which is connected to each of the ranging circuits, as shown.

The transducers 20, 22 and 24 are each operable both to transmit and to receive ultrasonic pulses. The ranging circuits 26, 28, 30 each include a transmitting circuit for generating a pulse to be transmitted by each associated transducer, and a receiving circuit for receiving and detecting the echo signal received through the transducer. Each of the ranging circuits 26, 28, 30 is operable to issue a timed "transmit" signal on respective connections 40, 42, 44 when the transmission of an ultrasonic burst of pulses begins, and an "echo" signal on connections 46, 48, 50 when the first detectable resultant ultrasonic echo returns.

The transmit and echo signals are supplied to range distance circuits 52, 54, and 56. The range distance circuits also receive clock pulses from a clock pulse circuit 58 which is connected to all of the range distance circuits 52, 54, and 56. The range distance circuits 52, 54, 56 are essentially gate circuits which are gated on by each transmit signal and gated off by the corresponding first detectable echo signal so as to pass a count of pulses from the clock circuit 58 which is directly proportional to the time interval from the transmit signal to the echo signal. That pulse count is directly proportional to the distance from the transducer to the object from which the echo has returned. The numbers of pulses are accumulated in the respective counters 60, 62, and 64. The counts from the counters 60, 62, and 64 are transferred through parallel connection trunks 66, 68, and 70 to a range distance logic circuit 72.

In operation, each ranging station is operable to determine the presence or absence of the body of a passenger within the beam of ultrasonic sound emitted from that station by means of the elapsed time from "transmit" to "echo". Thus, if a range distance is detected which corresponds to the height of the head or the shoulders of a person, the presence of a body of a passenger is detected.

The range distance logic circuit 72, in the preferred embodiment, is operable to analyze the data from the counters 60, 62, and 64 to determine whether the detected distance from the respective transducers indicates the presence or absence of a passenger's body under each of the three transducers. That information is supplied from the range distance logic circuit to a sequence logic circuit 74. The sequence logic circuit receives from the range distance logic circuit the signals indicative of the presence of bodies detected by the three different ranging stations. The sequence logic circuit 74 is then operable to temporarily record and interpret the sequence of signals to determine whether a passenger has entered the vehicle. If so, the sequence logic circuit produces an output count to a result counter 76, which may preferably provide a digital display of the accumulated count. If desired, the counter 76 may simply register a count of all passengers entering the bus, or all passengers departing from the bus, or the difference may be registered by incrementing the counter 76 each time a passenger enters, and decrementing the counter each time a passenger leaves. Alternatively, a second counter may be provided so that there may be an accumulation of the count of those entering and those leaving. The sequence logic circuit must then be operable to detect whether passengers have departed, as well as whether they have entered.

The range distance logic circuit 72 and the sequence logic circuit 74 may be combined in a single data processor with suitable memories for accomplishing the logic functions and for storing operating programs.

The preferred type of energy for operation of the ranging stations is ultrasonic sound energy. The energy is then emitted in a pulse of energy oscillations within a limited wave length spectrum which is normally referred to as ultrasonic sound. When using that form or energy, the ranging systems may be referred to as "sonar", although "sonar" is a term which is usually applied to underwater sound ranging systems.

While ultrasonic ranging systems are preferred for the present invention, it is possible to use other types of energy pulses, for instance, such as light pulses, which may be emitted in noncoherent or coherent (laser) light beams.

In the preferred embodiment, repeated range measurements are taken in sequence by the three different ranging stations. Since the ranging stations each operate in their own unique time interval, there is no chance for interference between one station and another. Thus, no echos from one station are detected and recorded by another station. The sequence of operation is repeated at a frequency, in the preferred embodiment, of about 10 hertz (10 operations or readings per second) by each station. It will be apparent that this repetition rate is relatively high in relation to the rate at which bodies progress in their movement through the doorway passage.

The range distance logic circuit 72 operates to determine the presence of a body, or the absence of a body, under each ranging station on the basis of a range distance measurement of less than a predetermined distance corresponding to the presence of a body of greater than a predetermined height. Thus, for instance, in one practical embodiment, a reflection at a distance corresponding to a passenger height of four feet, or greater, is recorded as indicating the presence of a body. When a body is absent from a particular step, the range distance logic circuit is operable to detect and interpret a range measurement based upon a reflection from the step to which the range station is focused for indicating the absence of a body to be counted at that step. If a range distance greater than the distance to the associated step is detected, the range distance logic circuit is operable to interpret the detection of such greater range distance as an indication of the presence of a body to be counted which is deflecting the ranging beam away from the step, but which for some reason is not reflecting the beam back to the transducer at a sufficient level to be detected as an echo. Alternatively, the range distance logic circuit may be operable when a range distance greater than the range measurement to the step is detected to assign a value to the present range reading corresponding to the last previous range reading having a valve no greater than the distance to the associated step. Thus, in this case, the range distance logic circuit essentially ignores the long distance reading which apparently resulted from a deflection of the ultrasonic beam and carries on with the last previous reading which was recognized as a valid reading.

In order to improve the reliability of the ranging systems, in a preferred embodiment of the invention, the range distance logic circuit is operable to continually compute a running average of a predetermined limited number of range measurements at each ranging station, and to use that running average for determining the input to the sequence logic circuit 74. The running average may preferably relate to only two sequential range measurements.

The transducers 20, 22, and 24 of the ranging stations are preferably positioned with a substantial mutual longitudinal separation, as shown in the drawing, and the transducers are operable to provide radiation beams having a narrow focus having a 12° to 15° beam width so as to maintain a physical separation between ranging zones covered by the separate ranging stations at the height of the shortest passenger to be detected. The transducers are preferably spaced apart longitudinally of the passageway at spacings corresponding to the spacings between the center lines of the steps 14, 16, and 18. These spacings may be about 10 inches, corresponding to the tread depth. While the narrow beams may overlap to some extent near the bottom portions thereof, at the level at which valid body detection signals are recognized by the range distance logic circuit 72, the energy beams are substantially separated to thus provide discrete signals in response to bodies present on the separate steps. However, it is one of the important features of the invention that a body which is moving between two steps is usually effective to provide reflections for both of the beams serving those two steps so as to provide the recognitiion of the double signal in response to that one body by the range distance logic circuit 72 and the sequence logic circuit 74. This provides more information than the prior art tread switch detection systems, because the tread switch systems provide both signals for only an instant while weight is being transferred from one foot to the other, whereas the present system provides double signals for the entire interval while the passenger's body is in transit from one step to the other.

While not separately illustrated in the drawing, the ranging circuits 26, 28, and 30 may include gated power supplies which are essentially controlled by the commutation control 38. The commutation control 38 preferably is operable to turn on and then turn off each of the ranging circuits 26, 28, and 30 by gating the associated power supply on and off. The off time is necessary for each ranging circuit to permit the echos for each ranging station to die out and to permit resetting of the circuit and recovery of the circuit for a new pulse transmit and echo cycle.

The counter 60, 62, 64 also must be reset after each operation so that each counter is ready to receive a new distance count. Reset signals may be applied for this purpose from a commutation control 38A which operates in synchronism with the commutation control 38.

The range distance logic circuit 72 preferably includes digital buffer registers for receiving and temporarily storing the respective counts from the counters 60, 62, 64. The operation of those registers in taking the readings from the counters 60, 62, 64 must be controlled in a sequence which is synchronized with the operation of the commutation control 38. The presence of such commutation control signals is indicated by a commutation control circuit 38B. Since both commutation control 38A and 38B must be synchronized with commutation control 38, these commutation controls may preferably be combined in a single apparatus, although they are shown separately in the drawing for simplicity and clarity.

It will be understood that the range distance circuits 52, 54, 56 may each include driver amplifiers for receiving relatively weak signals from the ranging circuits 26, 28, 30 on the control lines 40–50 and for operating gating devices within the range distance circuits 52, 54, 56.

In a practical embodiment of the invention, the pulse generator 58 is operated at a pulse frequency such that each pulse stored in one of the counters, 60, 62, 64 in the elapsed time interval between the transmit and echo signals represents one tenth of a foot. In that preferred embodiment, the counters are provided with seven counting stages, which provides the capability of storing a count corresponding to a distance of over 12 feet. If the acoustical signal is deflected so that a reflection or echo signal is not detected, the individual range distance counter 60, 62 or 64 will count to a distance greater than the distance from the transducer to the floor. The counter is read-out and reset by a signal generated by the commutation control 38A before the overflow can occur. The system recognizes the over count condition since the range distance logic circuit 72 has the floor distance count in memory.

While not illustrated in the drawing, the system may preferably include a switch input signal from a door switch on the vehicle through which passenger movement is being monitored. Thus, the system is activated only when the door is open, as indicated by the door switch. The range distance logic circuit 72 may include sufficient buffer memory to store a series of data readings over an interval of time, and to process those readings during intervals when the vehicle door is closed, or when no passengers are interrupting any of the acoustical beams. Thus, the range distance logic circuit 72 and the sequence logic circuit 74 may successfully process all of the data gathered by the three ranging stations, even though they are not capable of processing the data as fast as it is initially taken. Therefore, an inexpensive, slow speed digital processor may be employed to provide the functions of these logic circuits, or the digital processor may perform the necessary logical functions on a time-sharing basis in a computer which is shared with other systems.

As shown in the drawing, the transducers 20, 22 24 are preferably installed in the ceiling of the vehicle which is being served. It is one of the major advantages of the system when used in a bus entrance that these devices are safely mounted in a position where they are kept dry and free from any physical wear or abuse. The transducers are indicated as single transducers 20, 22 and 24 in FIG. 1. However, a multiple transducer array is preferred in each position, as illustrated in FIG. 2.

Figure 2:
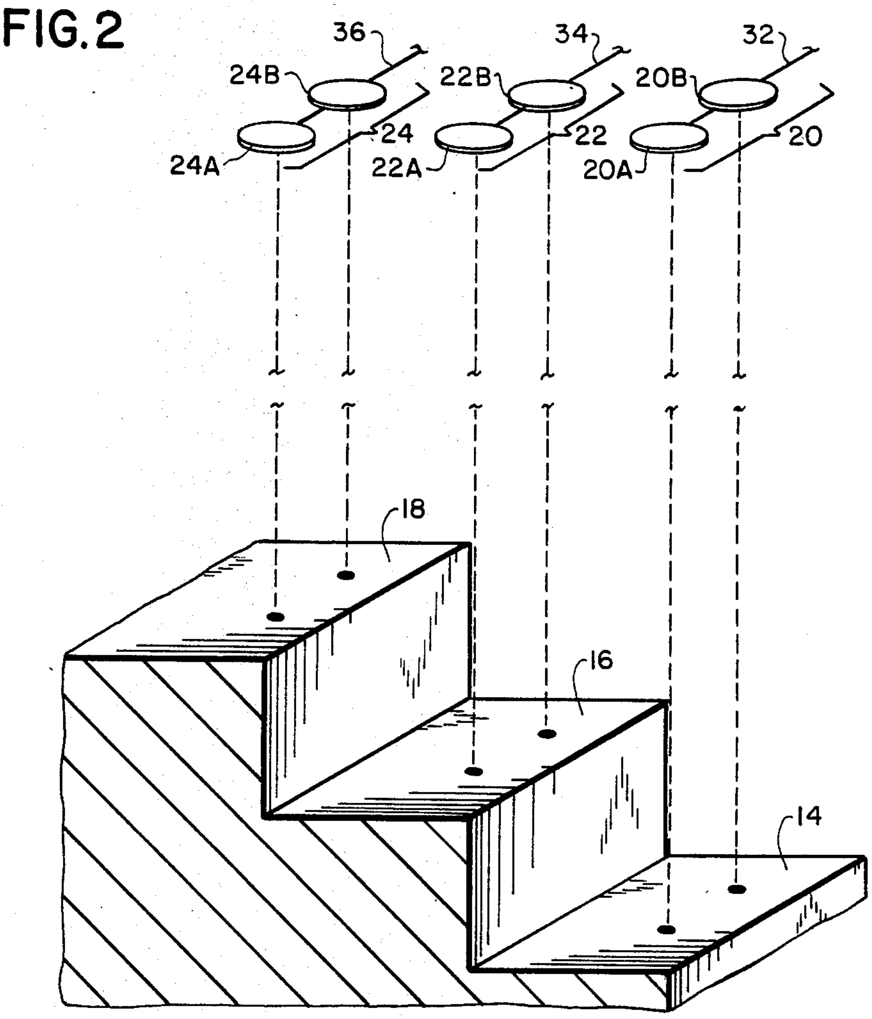
FIG. 2 is a partial perspective detail view of the passage of the system of FIG. 1 showing the preferred arrangement of ranging station transducers in the passage.

FIG. 2 is a partial schematic perspective view of the passage 12 of FIG. 1 including the steps 14, 16, 18 of FIG. 1 and the transducers 20, 22, 24. As shown in FIG. 2, each transducer position preferably includes at least two separate transducers to provide for a radiation pattern which more effectively covers the area of the associated step. The separate transducers in each position are arranged in a side-by-side relationship spaced apart in a direction transverse to the longitudinal direction of travel through the passage. Thus, the array of transducers for step 14 at transducer position 20 includes two separate transducers 20A and 20B. Similarly, for step 16, the array of transducers includes transducers 22A and 22B, and for step 18 transducers 24A and 24B. The transducers in each combination are electrically connected together through the circuit connections 32, 34, 36 to the associated ranging circuits.

Throughout the drawings, single line circuit connections are often employed for simplicity. A second connection, such as a ground return connection, is always implied.

In FIG. 2, the aiming point for each transducer is indicated on the associated step and related to that transducer by a dotted center line from the transducer to the step. The transducers in each set together issue ultrasonic sound pulses, and each is operable as a receiver for receiving and detecting the resultant echo. The longitudinal distance between sets of transducers is preferably substantially equal to the longitudinal dimension of the individual steps as previously discussed above. In one practical embodiment of the invention, the transverse separation between transducers within each set is about 6 inches. However, other dimensions may be usefully employed. Also, more than two transducers may be ganged together in the transverse direction.

Figure 3:
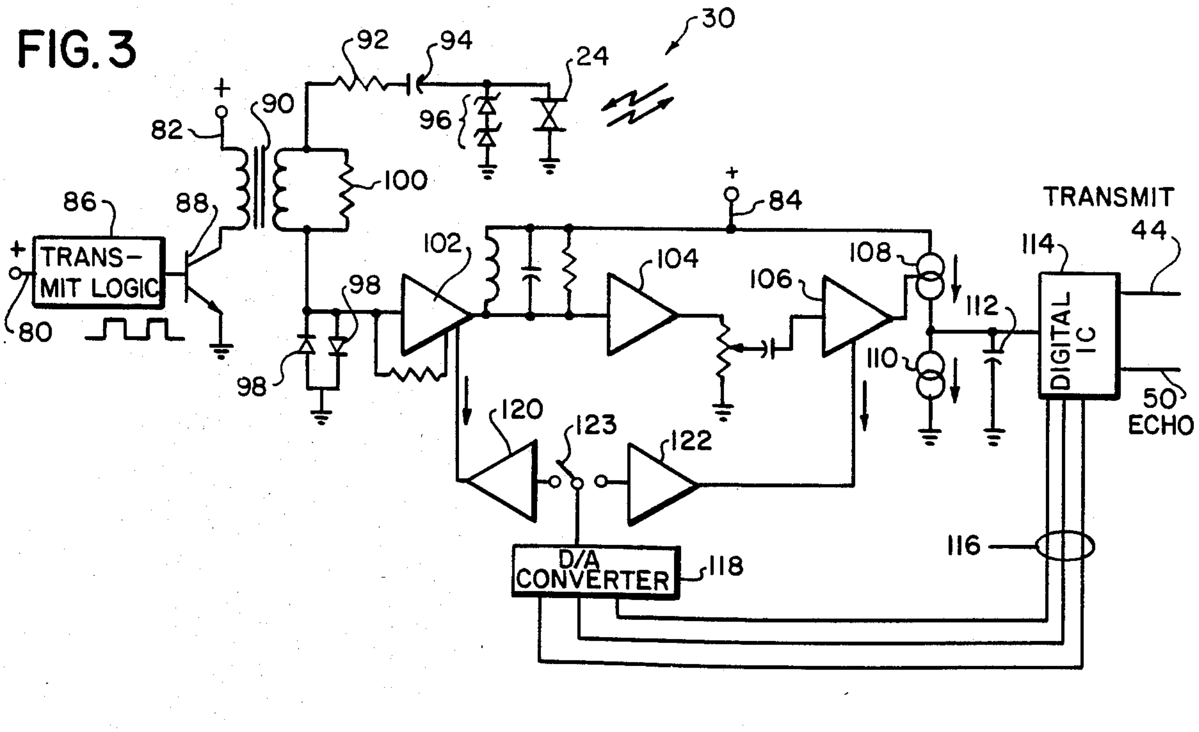
FIG. 3 is a schematic circuit diagram of an ultrasonic transceiver circuit which is employed in the systems of FIGS. 1 and 2.

FIG. 3 is a schematic diagram of the ranging circuit 30 used at the ranging station associated with transducer 24 in the system of FIG. 1. The transducer 24 is shown. The other ranging circuits 26 and 28 are substantially identical. Power is applied to the circuit through a power module (not shown) at the three terminals 80, 82, and 84, which are each marked with a plus sign (+). When energized, the transmit logic circuit 86 is operable to emit a series of square wave pulses corresponding to the burst of ultrasonic acoustic pulses to be emitted by the transducer 24. These pulses drive a transistor 88, the output of which is coupled through a transformer 90 and resistor 92 and capacitor 94 to the transducer 24. The Zener diodes 96, which are connected in parallel with the transducer 24, are used to limit the peak to peak transmit voltage as one means of regulating the system gain. Diodes 98 complete the signal path for the transmit current, but provide an open circuit in the receive mode. A resistor 100 in shunt with the secondary of the transformer 90 lowers the Q of the circuit in the receive mode for response to all of the transmitted frequencies.

In the receive mode of operation, the received signals are amplified in a pre-amplifier 102, a buffer amplifier 104, and an amplifier 106. The output of the amplifier 106 consists of a transistor which controls a current source device 108. The current source 108 works against a current sink device 110 to charge a capacitor 112 to thereby detect a signal which is of sufficient amplitude to be detected as a valid signal. This arrangement discriminates against unwanted noise spikes, since the incoming signal is integrated by the charging of capacitor 112 from the current source 108 in opposition to the current sink 110. When the signal is of sufficient amplitude at capacitor 112, it is recognized as a valid signal by a digital integrated circuit 114.

Upon the emission of a transmit signal by the transmit logic 86, the receive circuit is operable to detect that the transmit event has occurred, and is then operable to emit an output signal from digital circuit 114 on connection 44. When an echo signal is received and detected by the receiver section, the circuit 144 emits an echo signal on connection 50.

In the operation of an ultrasonic ranging station, because of the dispersion and dissipation of ultrasonic energy as the distance to the reflective object becomes greater, the strength of the acoustic echo signal received by the transducer 24 may vary greatly. Accordingly, it is an important feature of the preferred ranging circuit that the receiving circuit includes an automatic gain control which is operable to substantially increase the gain of the amplifier as the time interval from the transmission of the ultrasonic signal to the reception of the reflected ultrasonic signal increases. This compensates for the dissipation and dispersion of the ultrasonic energy in the greater distance traveled. In the present circuit, the digital integrated circuit 114 includes a digital clock, and means for accumulating a count which is indicative of the time elapsed since the transmit signal was sent so as to provide a gain control function. Digital signals indicative of this count are provided from the digital integrated circuit 114 on lines 116 to a digital to analog converter 118. The digital to analog converter provides resultant analog control signals to gain control amplifiers 120 and 122. Gain control amplifier 120 controls the gain of the pre-amplifier 102. Gain control amplifier 122 controls the gain of amplifier 106. The digital signals also control the operation of a switch schematically indicated at 123 to send the output from converter 118 either to the amplifier 120 or amplifier 122.

The transmit logic circuit 86 is preferably programmed to cause the transmission of each burst or chirp of ultrasonic energy in a number of different ultrasonic frequency tones, emitting the different tones in sequence. Thus, in one preferred embodiment, the tone frequencies are 60, 57, 53, and 49.7 kilohertz for a total chirp width of about one millisecond. The signal consists of 8 cycles of 57 kilohertz, 16 cycles of 53 kilohertz, and 24 cycles of 49.7 kilohertz. The use of different frequencies in a rapid sequence has been found to greatly improve the reliability of the system since the phase of the reflected sound waves from different parts of a reflective object can set up interferences which can produce null effects at the receiver. Thus, there can be large variations in the reflected signal level as detected at the transducer depending upon the surface and the angular configuration of the reflected object. Since this interference effect is frequency-dependent, the use of different frequencies minimizes the interference effect and provides a relatively stable reflected signal response.

The transducer 24 and the ranging circuit 30 just described above in connection with FIG. 3 are preferably carried out in a form similar to that described by a paper presented at the 67th Convention of the Audio Engineering Society in October 1980 in New York by C. Biber, S. Ellin, E. Schenk, and J. Stempeck of the Polaroid Corporation of Cambridge, Mass. entitled "The Polaroid Ultrasonic Ranging System".

Transducers and ranging circuits of this description are commercially available as "Ultrasonic Ranging Systems" from the Polaroid Corporation.

As previously mentioned above, one of the most important advantages of the present invention is that the system provides more information about the movement of passengers and therefore more reliable information about the movement of passengers through the passage than do the prior art systems. Thus, a passenger moving from the first step 14 to the second step 16 must reflect the ultrasonic energy from both transducers 20 and 22 for at least part of the time during the movement from one step to the next. Similarly, as the passenger moves from step 16 to step 18, the beams from both transducers 22 and 24 will be reflected by that one passenger. These combination signals are in addition to the basic detection of the presence of a passenger on each step, as he progresses through the separate ultrasonic beams. Thus, if the signals indicating the presence of a passenger detected by each of the ultrasonic beams from transducers 20, 22, and 24 are assigned the letters A, B, and C, the sequence of signals which is detected by the sequence logic circuit 74 to indicate the entrance of a passenger through the passage will be as follows: A, AB, B, BC, C. The sequence logic circuit 74 will also recognize and produce a proper output count if the passage detection sequence reduces to other less obvious occupancy sequence streams such as A, AB, BC, C or A, B, C or AB, BC, C or AB, B, BC, 0. Because of the three ranging circuit sequencing, each ranging station is active only one-third of the time and is turned off or "blind" two-thirds of the time, thus the ranging stations act like strobe detectors as opposed to continuous detectors. As a result, fast moving passengers may cause some missing detector signals in a sequence. Also, if a passagener is bending over while climbing the stairs a different detector occupancy signal sequence may be created. These are two of the causes which an create some of the less obvious occupancy sequence streams indicated above.

One of the most important features of this invention is that the ultrasonic beam of each transducer is narrow enough, in the axis parallel to the movement of the passengers, so that the largest passenger cannot simultaneously reflect the A, B, and C beams. If there are simultaneous signals from the A, B, and C stations, the sequence logic circuit 74 will recognize that there are two closely spaced passengers passing through the detection zone. It is further preferable that the beam be narrow so that there is opportunity to detect a gap between passengers, but wide enough so that small single passengers usually can generate an overlap detection between adjacent stations. An important advantage of this invention is that with a three zone (transducer) detection system, passengers can be spaced so close to each other that a gap does not always have to be detected between passengers. With a two zone (transducer) detection system, a gap must be detected between every pair of successive passengers to accurately count streams of passenger movement. This means that a two zone detection system cannot accurately count passengers bunched close together as can the three zone detection system of the present invention.

With the above criteria of operation, the sequence logic circuit 74 can be designed to operate in a very sophisticated manner to detect the movement of passengers through the passage in either direction, even though that movement may be interrupted or erratic, or of varying speed. For instance, a passenger may step from the first step to the second step and then back to the first step before proceeding to the second and third step in entering the vehicle. Furthermore, the sequence logic circuit can also recognize partial entries and subsequent backing out of passengers in the detection zone and maintain the proper "no count".

It is also obvious that the invention provides the further advantage, when applied to the purpose of counting passengers entering or departing from a common carrier vehicle, that the components of the system may be mounted in the ceiling of the vehicle where they are free from the risk of damage by physical abuse or wear, or exposure to the elements.

Figure 4:
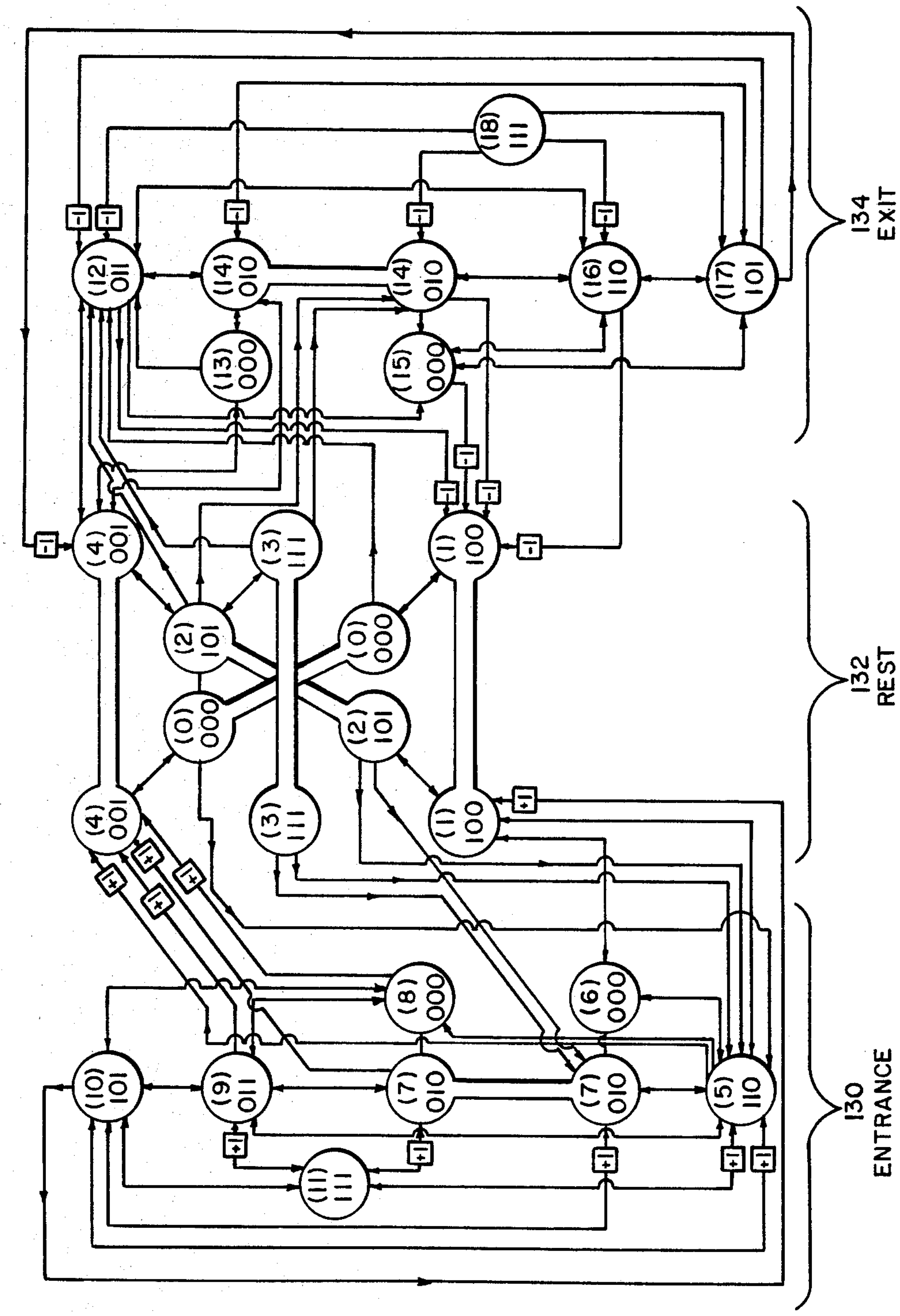
FIG. 4 is a logic chart illustrating the preferred logic operation of a sequence logic circuit 74 of the system of FIG. 1.

FIG. 4 is a logic chart illustrating the preferred logic operation of the sequence logic circuit 74 of the system of FIG. 1. The sequence logic circuit 74 deals with the accumulated data from the ranging stations in terms of three digit binary numbers, and in terms of sets of those three digit binary numbers, with each set generally including at least three of the three digit numbers. Each three digit binary number is indicative of the logic states represented for each of the three ranging stations associated with the ranging transducers 20, 22, and 24, and previously referred to as having assigned letters A, B, and C. Thus, if A has a logic value 1, B has a logic value 0, and C has a logic value 1, the binary number representing this status is 101.

Using the above notation, a sequence of three digit numbers as follows is typical of an entering sequence:

000, 100, 110, 010, 011, 001.

This sequence of binary numbers corresponds closely to the A, AB, B, BC, C sequence explained above. It can be further analyzed, along with other number sequences by reference to the logic chart of FIG. 4.

The logic chart of FIG. 4 illustrates 19 different logic states which are identified by numbers 0 through 18 in parenthesis. The logic states are divided into three different classes including entrance states 130, rest states 132, and exit states 134, as indicated by the brackets at the bottom edge of the figure. In some instances, such as with state (5), the states are indicated simply by a circle. In other instances, such as in state (7), the states are indicated by a figure that resembles a dumbbell (two circles with an interconnection). That arrangement is adopted simply to make it easier to show cross sections. The cross connections between the different state circles or dumbbells indicate changes from one state to another. Sequences which end in the recordation of a count are indicated by a "+1" or a "−1" shown in a box as a part of a cross connection from one state to the new state at which the count is recorded. The operation of the circuit according to the logic chart of FIG. 4 will now be described with relation to several examples.

Referring back again to the typical entering sequence listed above, that sequence is again listed for convenience as follows:

EXAMPLE 1

000, 100, 110, 010, 011, 001.

Referring to the logic chart of FIG. 4, the above sequence of three digit binary numbers corresponds to the following sequence of states:

(0) (1) (5) (7) (9) (4).

The passage from each of these states to the next state can be traced on the logic chart of FIG. 4. In the final connection from state (9) to state (4), there is a box containing a "+1", indicating that, at this stage in the sequence, a "+1" count is recorded.

Other similar examples are given as follows:

EXAMPLE 2

000, 001, 011, 010, 110, 100.

The sequence of states in the logic chart of FIG. 4 corresponding to this sequence of three digit binary numbers is as follows:

(0) (4) (12) (14) (16) (1).

It will be seen that this sequence leads from rest mode states into exit mode states and then back into a rest mode state, with the last transition resulting in a "−1" count. This is a typical sequence for an exit count operation.

EXAMPLE 3

000, 100, 110, 010, 111, 011, 001.

The above sequence corresponds to the following sequence of states:

(0) (1) (5) (7) (11) (9) (4).

Referring to the chart of FIG. 4, and following this sequence along the lines interconnecting the various states, it will be seen that the transitions from state (11) to state (9) and from state (9) to state (4) each generate a "+1" count. Thus, this sequence of data represents the entrance of two passengers (or the passage of two bodies).

EXAMPLE 4

000, 001, 011, 010, 111, 110, 100.

Following this sequence of binary numbers on the chart the following numbered states are traversed:

(0) (4) (12) (14) (18) (16) (1).

From the chart, it is seen that the transition from state (18) to state (16) produces a minus 1 count, and the transition from state (16) to state (1) will also generate a "−1" count so that this entire sequence measures the exit of two bodies.

EXAMPLE 5

000, 100, 110, 010, 110, 100.

This sequence of binary numbers corresponds to the following states from the chart:

(0) (1) (5) (7) (5) (1).

Reference to this sequence on the chart shows that no plus or minus counts are generated. This sequence represents a situation where a passenger commences entry and then backs out again before completing his entry.

In the preceding description, it was suggested that all detected passenger heights above four feet are recorded as indicating the presence of a body. It is one of the advantages of the ranging station mode of detection, however, that the variation in the detected height of a body at successive measurements as a body passes beneath a particular ranging station, may be employed, if desired, as additional information to indicate movement. The variations may be detected by setting other thresholds, or by determining the direction of change and reversals of directions of change in detected heights. This is a function which is not available with other detectors such as stair tread switches.

It will be apparent that passages served by the present invention may be arranged side-by-side, with separate ranging stations positioned to serve each of the side-by-side passages.

The invention has been described above as applied to the entrance of a common carrier motor bus having a stairway into the bus, because that represents an application of the system which is of immediate interest. Furthermore, as a matter of convenience, the ranging stations have been described as positioned respectively over the individual steps of the stairway into the bus.

However, it is quite apparent that the principles of the invention are equally applicable to passages which do not include stairs or steps. Such passages might include the entrances or exits for airports of convention halls, for instance. Furthermore, even where steps are provided in a passageway, the present system does not require that the separate ranging stations be longitudinally spaced apart by distances which are directly related to the spacing of the steps. This is another aspect in which the present invention provides for greater flexibility than does a system which relies upon stair tread switches for actuation.

One of the most important features of the invention is that three separate detection zones are provided for (by three separate ranging stations), the ranging stations being positioned so that a single body can occupy and be detected within one or two adjacent detection zones, but never more than two adjacent detection zones. If all three detection zones are occupied, the sequence logic circuit recognizes that there are at least two bodies present. This arrangement provides for more accurate counting of closely spaced passengers than does the two detection zone system of the prior art. In the prior two detection zone system, it is always necessary to have a gap between passengers in order to establish an accurate passenger count. With the three zone detection system of the present invention, a group of two closely spaced passengers require no gap detection, and in larger groups of passengers, it is only necessary that a gap be detected by at least one of the three detectors after every second passenger. Also, the three detection zone system is much more tolerant than the two detection zone system in properly counting passengers when the occupancy sequence is abbreviated from the complete sequence of A, AB, B, BC, and C, or the reverse of that sequence.

While not illustrated in the drawings, and not described in the above specification, the automatic counting system of the present invention may be incorporated in a larger system, particularly when it is employed to detect ingress and egress of passengers from a common carrier vehicle such as a bus. The larger system may preferably include a real time clock and a connection to the odometer of the bus, and also connections to switches on the doors of the bus so as to provide for accumulation of data relating not only to the ingress and egress of passengers, but also to the times when stops occur and passenger miles traveled. The accumulation of all of this data permits calculations of average daily passenger miles, average daily passenger trips, average trip distance per passenger, and average trip time per passenger.

The above disclosure relating to the system of this invention has emphasized the preference for at least three ranging stations in each passage. It will be apparent that more than three stations may be employed if desired to provide still more information and more accuracy. However, three stations are preferred.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

We claim:

1. An automatic counting system for non-uniform bodies having a non-uniform speeds in either direction through a constricted passage comprising a ranging apparatus having at least three ranging stations spaced longitudinally along the passage for detecting the presence and absence of bodies to be counted at said stations, and a sequence logic circuit connected to said ranging apparatus for detecting and interpreting the sequence in which bodies are detected at said ranging stations for thereby counting the passage of bodies said ranging stations all including means operable to determine the distance to a detected body for detecting the presence of that body by emitting a pulse of energy oscillations within a limited wave-length spectrum and for measuring the time interval until that energy is reflected back from a detected body to be counted.

2. A system as claimed in claim 1 wherein said ranging stations are operable to emit said energy at light wavelengths.

3. A system as claimed in claim 1 wherein said ranging stations are operable to emit said energy at ultrasonic sound wavelengths.

4. A system as claimed in claim 3 which is operable to take repeated range measurements, and which is operable to take range measurements in sequence by the three different ranging stations to eliminate interference between ranging stations.

5. A system as claimed in claim 3 wherein each of said ranging stations includes at least one ultrasonic transducer operable to transmit an ultrasonic signal and operable to receive an ultrasonic signal, a ranging circuit comprising a pulse generating circuit connected to said transducer, said ranging circuit also including a receiving circuit connected to said transducer, said receiving circuit including an automatic gain control operable to substantially increase the gain of said receiving circuit as the time interval from the transmission of the ultrasonic signal to the reception of the reflected ultrasonic signal increases to compensate for the dissipation and dispersion of the ultrasonic energy in the greater distance traveled.

6. A system as claimed in claim 3 wherein said ranging stations include means operable to issue ultrasonic ranging signal pulses each including a plurality of different ultrasonic frequencies, each of said stations being operable to recognize a strong response at any one of said frequencies as a valid reflection.

7. A system as claimed in claim 6 wherein said ranging stations are operable to issue said plurality of different frequencies in a rapid sequence.

8. A system as claimed in claim 3 wherein said ranging stations are aligned to carry out the range measurements from each station in a direction substantially transverse to the direction of the constricted passage.

9. A system as claimed in claim 8 wherein said ranging stations are operable to make range measurements repeatedly from each ranging station at a rate substantially higher than the expected rate of progress of bodies through the passage.

10. A system as claimed in claim 8 wherein said ranging stations are operable to make each range measurement by transmitting a sonic signal downwardly and receiving the resultant upwardly reflected signal.

11. A system as claimed in claim 10 wherein said ranging stations each include at least two ultrasonic ranging transducers arranged in a pattern transverse to the passage in order to provide a pattern of radiation to substantially cover the width of the passage at each ranging station.

12. A system as claimed in claim 10 wherein the bodies to be counted are live human bodies and wherein the constricted passage comprises a stairway having at least three step levels and wherein said three ranging stations are respectively positioned and arranged to detect the presence of bodies on said three step levels by focusing the energy to those respective associated step levels.

13. A system as claimed in claim 12 wherein said constricted passage comprises a passage between the outside and the inside of a common carrier passenger vehicle.

14. A system as claimed in claim 12 wherein said ranging stations each include at least two ultrasonic ranging transducers positioned and arranged in a pattern transverse to the passage and parallel to the associated step level in order to provide a pattern of radiation to substantially cover the associated step surface.

15. A system as claimed in claim 10 wherein said ranging stations are positioned with a substantial mutual longitudinal separation and are operable to provide radiation beams having a narrow focus so as to maintain a physical separation between ranging zones covered by the separate ranging stations.

16. A system as claimed in claim 10 wherein each of said ranging stations includes an output connection and wherein there is provided a separate associated range distance logic circuit connected to receive the outputs at the output connection from each of said ranging stations and operable to determine the presence or absence of a body under each ranging station on the basis of a range distance measurement of less than a predetermined distance corresponding to the presence of a body of greater than a predetermined height.

17. A system as claimed in claim 16 wherein each said range distance logic circuit is operable to detect a range measurement based upon a reflection from an associated surface portion which is the portion of the surface of the passage to which the associated ranging station is directed for indicating the absence of a body to be counted at that surface portion.

18. A system as claimed in claim 17 wherein said range distance logic circuit includes means operable to interpret the detection of a range distance which is greater than the distance to the associated surface portion as an indication of the presence of a body to be counted which is deflecting the ranging beam.

19. A system as claimed in claim 17 wherein said range distance logic circuit includes means operable when a range distance greater than the range measurement to the associated surface portion is detected to assign a value to the range reading corresponding to the last previous range reading having a value no greater than the distance to the associated surface portion.

20. A system as claimed in claim 16 wherein said range distance logic circuit includes means operable to continually compute a running average of a predetermined limited number of range measurements at each ranging station and to use that running average for determining the input to said sequence logic circuit.

21. A system as claimed in claim 1 wherein said sequence logic circuit includes means operable by interpretation of sequences in the detected presences and absences of bodies at the separate ranging stations to determine the count of bodies traveling in a first direction through said constricted passage.

22. A system as claimed in claim 21 wherein the detection zones for each of said ranging stations are arranged substantially contiguously so as to provide for substantially concurrent detection of the presence of a body by adjacent ranging stations as the body passes from the detection zone of one ranging station to the detection zone of the next adjacent ranging station, said sequence logic circuit being operable in response to the substantially concurrent detection of a body by two adjacent ranging stations as important elemental steps in the sequences for determining the count of bodies traveling in said first detection through said passage.

23. A system as claimed in claim 21 wherein said sequence logic circuit includes means operable by interpretation of sequences of detected presences and absences of bodies at the separate ranging stations to determine the count of bodies traveling in a second direction opposite to said first direction.

24. A system as claimed in claim 23 wherein said sequence logic circuit includes means for deriving the difference in the number of bodies passing through said passage in said first direction and in said second direction over a substantial time interval.

25. A system as claimed in claim 14 wherein said ranging system includes a separate ranging circuit for each ranging station, each of said ranging circuits including a drive means for energizing an associated transducer to radiate the desired ultrasonic pulse, each of said ranging circuits including a receiving means for receiving the reflected ultrasonic signal, and a range distance circuit for recording the time interval from the transmission of the ultrasonic signal to the reception of the resulting reflected signal.

26. A system as claimed in claim 21 wherein said ranging stations are positioned and arranged to provide substantially contiguous detection zones, and wherein said sequence logic circuit includes means operable in response to the substantially concurrent detection of the presence of a body by all three ranging stations to indicate that there are at least two bodies within the three detection zones.

27. A system as claimed in claim 23 wherein said sequence logic circuit includes means for determining a zero count condition upon entry of bodies into the detection zones of said ranging stations from either said first detection or said second direction when said bodies reverse motion and back out before passing through the sequence of detection zones of said ranging stations.

* * * * *